United States Patent [19]
Lacey

[11] 3,716,213
[45] Feb. 13, 1973

[54] VEHICLE SEATS HAVING RESILIENT MOUNTINGS

[75] Inventor: Robert R. Lacey, Northampton, England

[73] Assignee: Universal Oil Products Company, Des Plaines, Ill.

[22] Filed: Feb. 19, 1971

[21] Appl. No.: 117,025

[30] Foreign Application Priority Data

Feb. 21, 1970    Great Britain.......................8,426/70

[52] U.S. Cl................................................248/399
[51] Int. Cl.............................................F16m 11/00
[58] Field of Search............................248/399; 92/7

[56] References Cited

UNITED STATES PATENTS

| 3,144,270 | 8/1964 | Bilancia................248/399 X |
| 2,302,232 | 11/1942 | MacNeil...................92/7 X |

*Primary Examiner*—Marion Parsons, Jr.
*Attorney*—James R. Hoatson, Jr. and Philip T. Liggett

[57] ABSTRACT

A vehicle seat comprises a seat part resiliently mounted for upwards and downwards movement relative to a base part, a vibration damper being connected between the seat part and base part by a linkage which acts to produce an increasing damping effect with increasing travel of the seat part upwards or downwards from a Ride-position.

4 Claims, 1 Drawing Figure

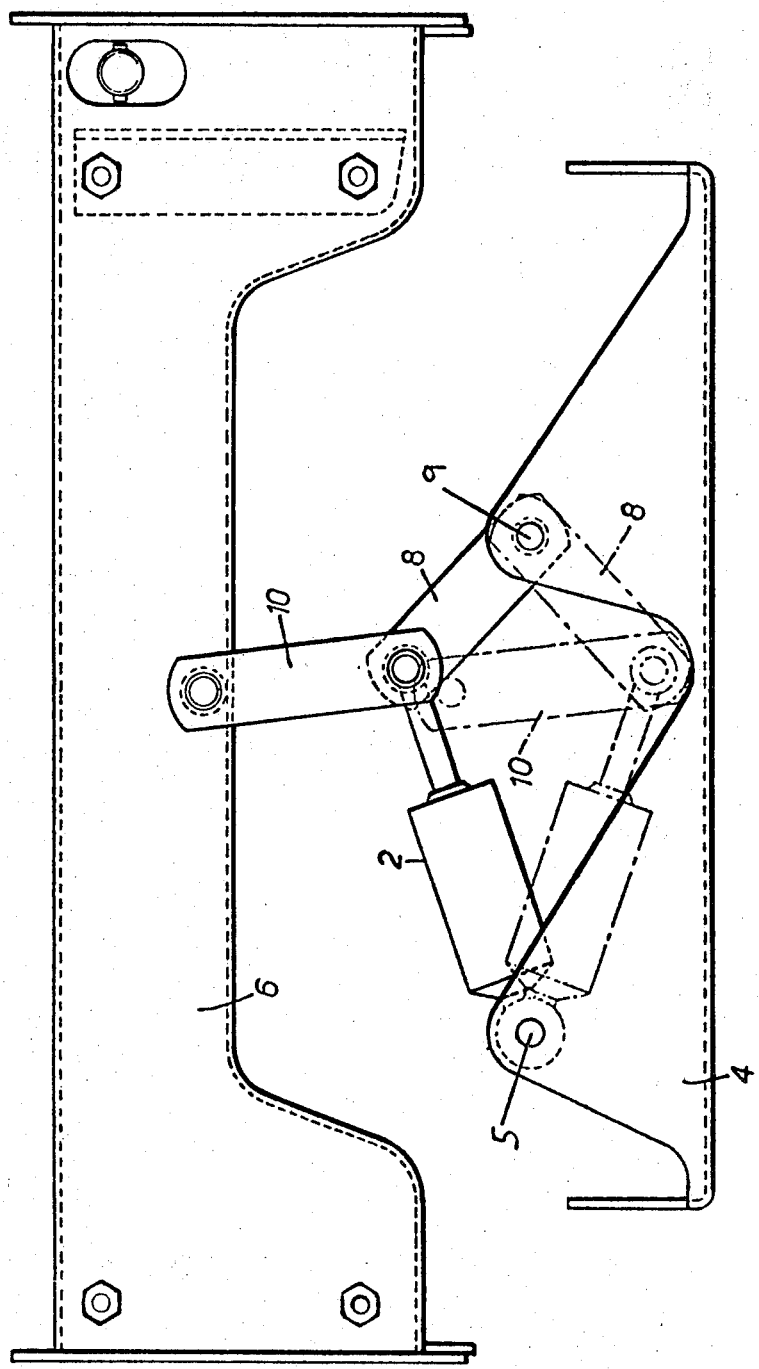

VEHICLE SEATS HAVING RESILIENT MOUNTINGS

BACKGROUND OF THE INVENTION

1. Field of the Invention.

This invention relates to vehicle seats, and in particular to dampers for use in vehicle seats to damp the vertical component of vibrations applied to the seat from the vehicle.

2. Description of the Prior Art.

In a vehicle seat, in which a seat part is mounted for upward and downward movement relative to a base part, it is conventional practice to connect a vibration damper, in addition to the normal springs, between the seat part and base part of the vehicle seat. Such a damper conveniently comprises a piston/cylinder device in which fluid can leak past the piston at a restricted rate, one end of the device being pivotally connected to the base part and the other end being pivotally connected to the seat part. With this arrangement, it will be seen that equal damping will occur at substantially all positions of the seat part relative to the base part.

SUMMARY OF THE INVENTION

According to the present invention, there is provided a seat comprising a seat part mounted for upward and downward resilient movement relative to a base part, and a vibration damper interposed between the seat part and base part, the arrangement being such that the damping effect of the damper increases as the seat part moves upwardly or downwardly from a position substantially mid-way between the UP-stop and DOWN-stop positions of the seat part.

Further according to the present invention, there is provided a seat comprising a base part, a seat part supported from the base part for upwards and downwards movement against a resilient bias, and a vibration damper connected by a linkage between the seat part and base part, the linkage serving to produce increasing damping actions of the damper with increasing vertical travel of the seat part away from its midposition.

BRIEF DESCRIPTION OF THE DRAWING

An embodiment of the invention will now be described, by way of example only, with reference to the accompanying diagrammatic drawing the sole FIGURE of which is a fragmentary elevation of a seat according to the present invention.

DESCRIPTION OF THE PREFERRED EMBODIMENT

As shown in the drawing, a damper 2 in the form of a piston/cylinder device is located between the base part 4 and the seat part 6 of a vehicle seat, one of the operative elements of the damper 2, for example the cylinder, is pivoted to the base part 4 about an axis 5 and the outer end of the piston rod is pivoted at one end of a first linkage arm 8. The first linkage arm 8 is pivoted at its other end to the base part 4 about an axis 9 spaced from the axis 5, and to one end of a second linkage arm 10, the latter being disposed approximately vertically and pivoted at its other, and upper, end to the seat part.

It will be apparent that when the seat part is at the mid-point of its vertical travel, between its UP-stop and DOWN-stop positions, the piston rod (and thus the axis of the damper 2) and the first linkage arm 8 are substantially co-linear and horizontal, but as the seat part 6 rises or falls from the mid-position, so the second linkage arm 10 will pull the piston rod upwardly or push it downwardly so that the piston rod and the first linkage arm are at an angle to one another thereby moving the piston progressively away from a substantially mid-position within the cylinder.

More particularly however, as the seat part 6 vibrates slightly about its mid-position, the actual travel of the piston relative to the cylinder will be very slight so that only the minimum damping effect, if any, is applied.

In this way, mild vibrations which are applied to the seat part 6 at the mid-position in its vertical travel will be only slightly damped, but this damping will increase as the vibrations increase in amplitude and move the seat part 6 upwardly or downwardly away from the mid-position.

This damping system described is designed particularly for use in a vehicle seat in which the seat part is suspended on crossed arm linkages disposed in a fore and aft direction at the sides of the seat, but is also applicable to a seat in which the seat part is pivoted to one end of a suspension arm of which the other end is pivoted to the base part, the seat being held in a substantially horizontal position either by one or more similar arms connected to the suspension arm to form a parallelogram arrangement, or by connection of the back of the seat part to a carriage having rollers which roll in a guide column extending upwardly behind the back of the seat and forming part of the base.

What is claimed is:

1. A seat comprising a base part, a seat part, said seat part being mounted for substantially vertical movement about a Ride-position relative to said base part, a vibration damper, including a piston element and a cylinder element, one of said elements being pivotally connected to one of said parts about a first axis, and a linkage connecting said vibration damper between said seat part and said base part, said linkage including a first arm pivotally connected to the other of said elements of the damper and pivotally connected to said one of said parts about a second axis spaced from said first axis, said linkage being arranged so that said first arm is substantially co-linear with the axis of the damper when said seat part is in the Ride-position and so that the inclination of said first arm relative to the axis of the damper increases with increasing vertical travel of said seat part in either direction of movement away from the Ride-position.

2. A seat according to claim 1 wherein the damper is positioned relative to said linkage so that its overall length will be a minimum when the seat part is in its Ride-position, the overall length of said damper becoming greater at an increasing rate as the seat part is moved either up or down from the Ride-position at a constant rate.

3. A seat according to claim 1 wherein said linkage comprises a second arm pivotally connected at one end portion to said first arm and at the other end portion to the other of said parts.

4. A seat according to claim 3, wherein when said seat part is in the Ride-position said first arm and the axis of the damper are substantially horizontal, and the second arm extends approximately vertically.

* * * * *